United States Patent [19]

Moss

[11] 4,129,411
[45] Dec. 12, 1978

[54] FLUID DISTRIBUTOR

[75] Inventor: Gerald Moss, Oxford, England

[73] Assignee: Exxon Research & Engineering Co., Florham Park, N.J.

[21] Appl. No.: 833,672

[22] Filed: Sep. 15, 1977

Related U.S. Application Data

[63] Continuation of Ser. No. 679,179, Apr. 22, 1976, abandoned.

[30] Foreign Application Priority Data

Apr. 24, 1975 [GB] United Kingdom ............... 17032/75

[51] Int. Cl.² .............................................. F27B 15/00
[52] U.S. Cl. .................................... 432/58; 34/57 A;
222/195; 222/271; 15/256.52; 302/53
[58] Field of Search ....................... 432/14, 15, 78, 58,
432/75, 85, 236; 34/57 A, 57 R, 57 C, 57 D;
222/271, 195; 259/DIG. 17; 302/53; 15/256.52

[56] References Cited

U.S. PATENT DOCUMENTS

| | | | |
|---|---|---|---|
| 1,448,162 | 3/1923 | Sneddon | 432/236 |
| 1,927,634 | 9/1933 | Fahrenwald | 432/236 |
| 2,542,587 | 2/1951 | Smith | 34/164 |
| 2,730,770 | 1/1956 | Higginbotham et al. | 15/256.52 |
| 3,512,683 | 5/1970 | Frisbie | 222/271 |
| 3,558,111 | 1/1971 | Avery | 432/15 |
| 3,581,407 | 6/1971 | Ward et al. | 34/166 |
| 3,721,608 | 3/1973 | Saller et al. | 34/57 A |
| 3,913,798 | 10/1975 | Allen | 222/412 |
| 3,933,280 | 1/1976 | Plumb | 222/195 |
| 4,014,642 | 3/1977 | Helming | 432/78 |

FOREIGN PATENT DOCUMENTS 502964 2/1976 U.S.S.R. ................................. 432/236

Primary Examiner—Henry C. Yuen
Attorney, Agent, or Firm—F. Donald Paris

[57] ABSTRACT

The invention comprises a fluid distributor which, in a preferred embodiment, comprises an array of parallel rollers rotatably mounted at their ends. All, or alternate, rollers have a number of peripheral grooves or slots which define, with adjacent rollers, apertures for the passage of fluid through the distributor. Suitable deposit-removing means (e.g. in the form of chisel-blades) are mounted either on rollers or separate support members so as to be opposite respective grooves or slots in the rollers and to be receivable in the grooves or slots, so that on relative movement of the grooved or slotted rollers and the deposit-removing means, the latter remove deposited material from the grooves or slots. The invention is useful in passing deposit-forming fluids (e.g. tarry or dusty gases) into fluidized beds supported on the distributor.

10 Claims, 9 Drawing Figures

FLUID DISTRIBUTOR

This is a continuation, of application Ser. No. 679,179, filed Apr. 22, 1976, now abandoned.

The present invention relates to fluid distributors and to equipment and processes employing fluid distributors.

Processes are known in which a fluid, e.g. a gas, containing entrained deposit-forming solids and/or solid-deposit-forming vapours are passed through a fluid distributor into a further processing stage — e.g., a stage containing a bed of solids, which may be fluidised by the fluid. For example, in the conversion of limestone to lime, particles of limestone are passed downwardly from one fluidised bed to the fluidised bed(s) beneath while being contacted in the beds by upwardly flowing hot gas containing deposit-forming fines. These fines tend to deposit on the underside of and in the gas distribution apertures of, the hot gases distributors supporting all but the lowest of the fluidised beds, thereby increasing the pressure drop through the series of beds. In another example, the hot gases from the gasification of a liquid, semi-solid or solid fuel may contain tars and other deposit-forming materials which tends to block the apertures of any gas distributor through which the hot gas flows: such a gas distributor may support a bed, e.g. a fluidised bed, for converting or removing components of the hot gas stream. Thus, if the hot gas contains sulphur, the bed may contain particles comprising a sulphur-fixing agent such as calcium oxide.

In one aspect, the present invention provides a distributor for distributing a fluid substantially uniformly from an upstream side thereof to a downstream side, the distributor comprising a succession of elongate members or rods arranged side-by-side, the axes of adjacent members or rods being substantially parallel and at least some of the members or rods being mounted for rotation about their axes, adjacent members or rods defining apertures for the passage of fluid therethrough.

The apertures are preferably defined by slots or recesses in the surface of at least some members or rods, and a slot or recess in one rod may be substantially opposite a contiguous part of the surface of an adjacent rod or part thereof, which contiguous part of the surface may not be slotted or recessed. There may be means for rotating all of the rotatably mounted rods in the same sense or direction. Preferably, all of the rods are rotatably mounted.

At least some of the rods may be hollow whereby a heat exchange fluid may be passed therethrough. Preferably, there are means which are at least partly receivable in the slots or recesses for removing material deposited or trapped in the slots or recesses. The said means may be scrapers, blades or like members shaped to enter the slots or recesses and to remove deposited material therefrom. The blades or like members may be provided on the said contiguous part of the surface of the members or rods and/or supported on supporting members or rods adjacent to the elongate members or rods, and the supporting rods are preferably rotatably mounted. Means are preferably provided for rotating the supporting rods in the same sense or direction, preferably in the same sense or direction as the rotatable rods defining the fluid-passage apertures. The said means may be provided on at least some of the elongate members or rods and so positioned that said means will be received in said apertures on relative rotary movement of said members. The elongate members or rods having said means, or the supporting rods, are rotated preferably at a speed (e.g. 1-2 r.p.m.) different to that of the elongate rods not having said means thereon. The support rods may be hollow whereby a heat exchange fluid may be passed therethrough.

Throttling means may be provided, e.g. by the blades or like means, or by throttling surfaces e.g. on the supporting rods, which can be moved or otherwise adjusted into and out of throttling relationship with the apertures for regulating the fluid flow therethrough. The throttling means may be below the elongate members or rods.

The elongate members or rods may be adapted to be arranged with one end of their axes higher than the other end so that the distributor slopes downwardly towards the lower end and preferably, the apertures are smaller towards the higher end and larger towards the lower end so that as solids supported on the distributor accumulate to a greater depth at the lower end, the resistance to fluid flow through the distributor and bed is substantially uniform.

The invention includes, in another aspect, an apparatus or installation comprising a distributor, as described above, mounted in a vessel. In an embodiment of such an installation, a hot gas-stream containing entrained deposit-forming material (e.g. solids, condensible and/or pyrolyzable materials in the vapour phase, etc.) is passed through the fluid passage apertures in the distributor into a bed of particulate solids which are fluidized by the gas stream. Such a hot gas stream may be generated in the fluidized processing of solids, such as the fluidized burning of limestone to lime and also in the gasification or part-combustion of a hydrocarbon and/or carbonaceous fuel and in the combustion of such fuels. When lime burning is performed in a multi-bed process with the beds of each processing stage arranged in succession above each other, solids tend to deposit on the underside of and in the gas-flow apertures of, the gas distributors supporting all but the bottom bed, thereby adversely affecting the pressure drop through the multi-bed process. The distributor of the present invention may be employed to avoid the build-up of such deposits, the blades, scrapers or like means being received within the apertures or recesses of the rods to remove deposits. In this type of process, it may be preferred to locate the blades or scrapers below the recess or aperture-defining elongate members or rods if they are on separate supporting members or rods.

A hot gas stream from fuel gasification tends to deposit tars on the surfaces of the rods of the distributor and these can be removed so as to maintain the performance of the distributor by rotating the rods and by "scraping" or cleaning out the apertures or recesses in the rods using the blades or scrapers. If the fuel gasification is performed in a fluidized bed, the hot gas stream may additionally comprise entrained solids which can deposit on the distributor.

The fluidised bed may be supported on a distributor of any suitable type, e.g. a distributor according to the invention. The distributor through which the hot gas stream passes may support a bed of material, preferably fluidized, in which condensible materials may be arrested for return, as fuel, to the gasification process. The bed may comprise reagents capable of removing from the hot gas stream undesirable materials such as sulphur.

The invention is now further described with reference to some examples thereof which are diagrammatically and/or schematically illustrated in the accompanying drawings in which:

FIG. 6 shows an alternative drive arrangement to that shown in FIG. 5;

FIG. 8 is a vertical cross-section showing the principal features of a pressurized fuel gasification installation comprising a distributor according to the invention, and FIG. 9 is a horizontal cross-section in the plane A—A of FIG. 8.

Figure 1:
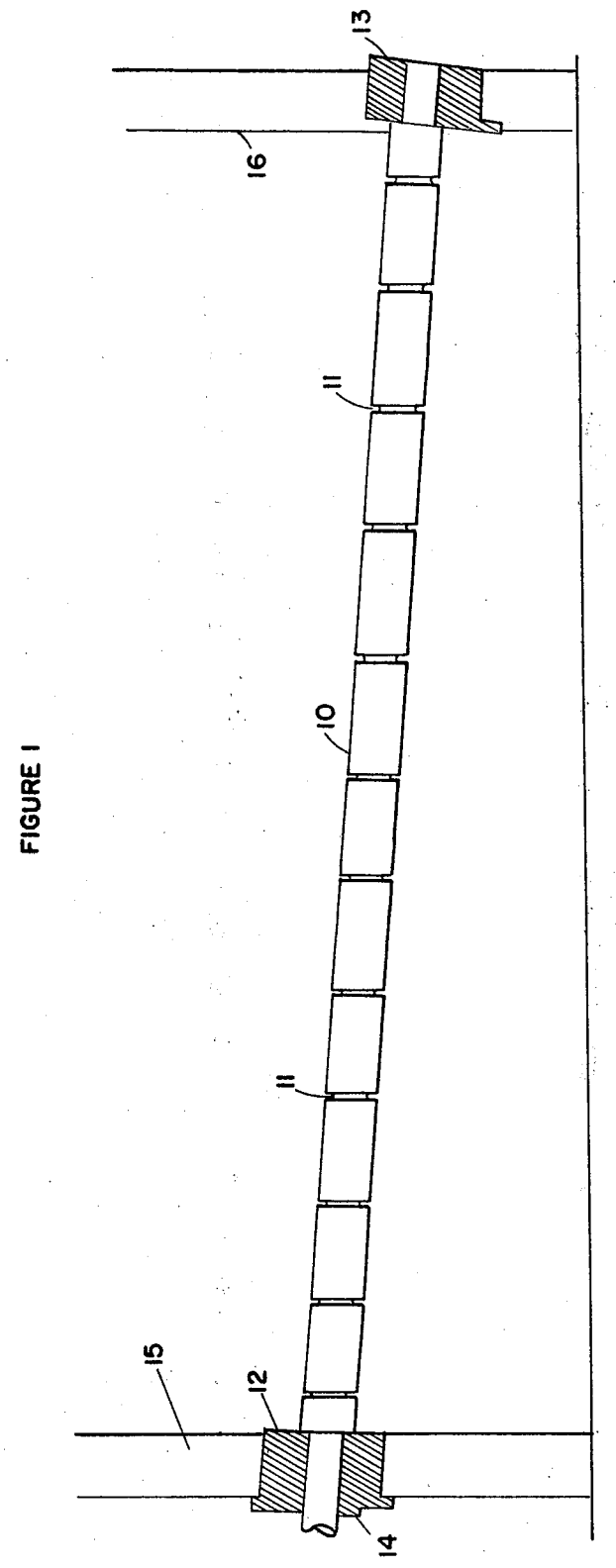
FIG. 1 is a side view of a rod used in the distributor of the invention.

In FIG. 1, there is shown a cylindrical rod 10 (which may be hollow for the passage of cooling gas or liquid) and which is provided with a number of peripheral slots or recesses, hereinafter termed "grooves" 11. The rod 10 is rotatably mounted in bearings 12, 13 at each end and supporting in bearings 12 by a stub shaft 14 which is connectable to means, such as a belt-and-pulley arrangement (not shown), for rotating the rod 10 at a relatively low speed (e.g. 1 to 2 r.p.m.).

One end of the rod 10 is higher than the other end and the bearings 12, 13 are located at different heights in end walls 15, 16 of a containing vessel.

Figure 2:
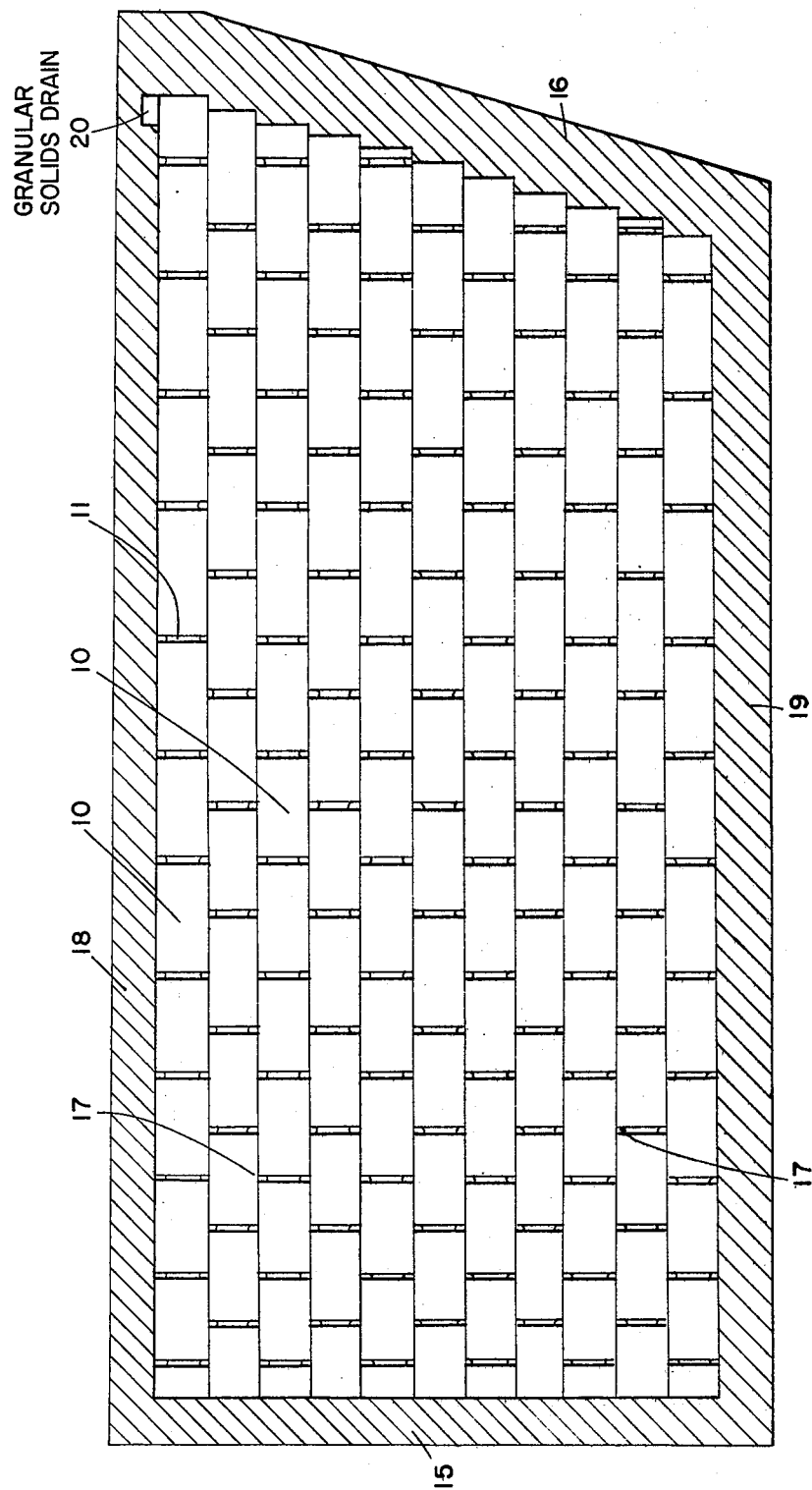
FIG. 2 is a plan view of a distributor comprising an array of rods, each rod being of similar form to that of FIG. 1.

In FIG. 2, a succession of rods 10 is arranged side-by-side with their axes parallel. Each groove 11 of one rod 10 is located opposite a non-grooved part of the adjacent rod 10 so that the groove 10 defines with the non-grooved part an aperture 17 for fluid flow through the distributor formed by the rods 10. The distributor is bounded at its sides by side walls 18, 19. As depicted, the distributor slopes downwardly from end wall 15 to 16. When the distributor is employed to support a bed of (e.g. fluidizable) particles which are to be contacted with a fluid which passes into the bed via the apertures 17 in the distributor (e.g. in the decarbonation of limestone by contact with hot combustion gases), a continuous flow of solids through the bed is promoted by passing the solids in at the higher end of the distributor and removing solids at the lower end, e.g. via a drain 20. In order to prevent blockage of the apertures 17, the rods 10 are rotated (e.g. by a motor acting through belts and pulleys). The rotation can be continuous or intermittent. To avoid nipping solid material in the apertures 17, the rods 10 are preferably all rotated in the same direction.

Although rotation of the rods 10 may be adequate to prevent blockage of the apertures 17 in some cases, there are common instances in which the material which deposits in the grooves 11 is so firmly held that it must be sheared or scraped out of the grooves. Such scraping out may be effected by providing scraping blades which are received in the grooves 11 so that on rotation of the rods 10, deposits are removed by the blades.

Figure 3:
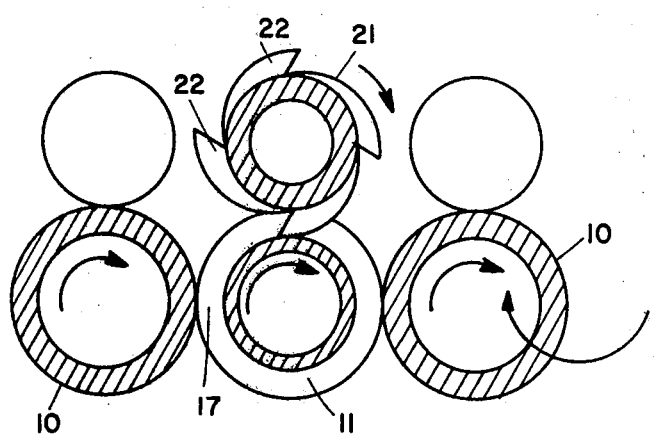
FIG. 3 is a vertical cross section through part of the distributor of FIG. 2, but which comprises means for cleaning the distributor.

In FIG. 3, the rods 10 are hollow so that a heat exchange fluid, such as cooling air, can be passed therethrough. A support roller 21 (shown in section) is mounted parallel to each rod 10 and each roller 21 is provided with scraper blades 22 which are located in the plane of each groove 11 and arranged for receipt in the groove 11 as the rod 10 is rotated so that deposits in the grooves 11 are sheared or scraped out. Preferably the rollers 21 are hollow for the passage of a heat exchange fluid, such as cooling air, and the rollers 21 are rotated by suitable means (not shown) preferably in the same sense as the rods 10, but at a different speed.

Figure 4:
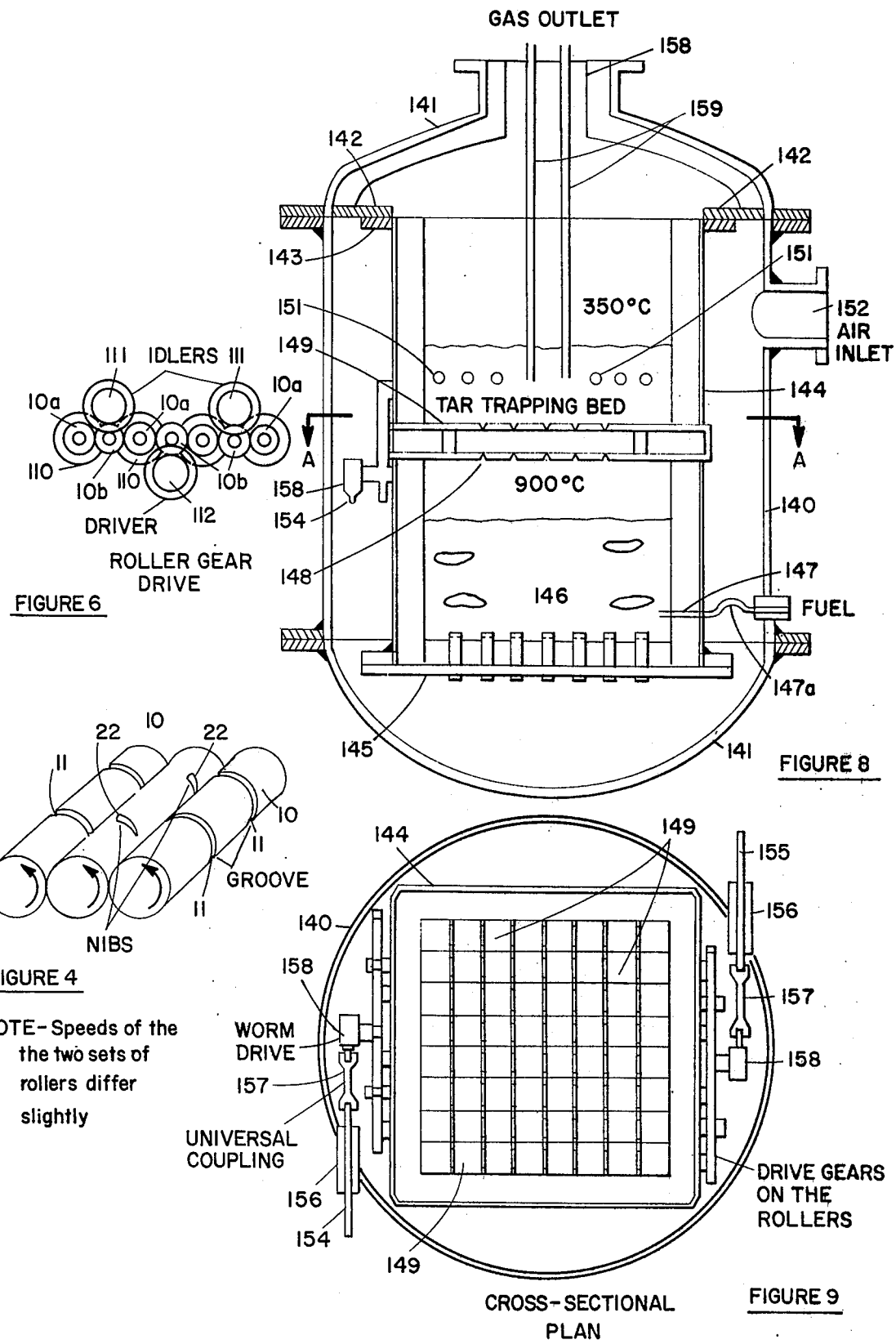
FIG. 4 depicts an alternative arrangement to that shown in FIG. 3.

In FIG. 4, the scraper blades 22 are provided on the rods 10 rather than on separate support means such as the support rollers 21 of FIG. 3. Each scraper blade 22 is located for rotation in the same plane as the groove or grooves 11 of adjacent rods so that on rotation of the rods, the blades 22 enter the grooves for the removal of deposits therefrom. Alternate rods 10 are preferably rotated at slightly different speeds so that the scraper blades 22 clean different parts of the grooves 11 on successive cycles. Preferably, all the even-numbered rods are rotated at one speed and all the odd-numbered rods 10 are rotated at another speed to simplify the drive arrangements. Although FIG. 4 depicts rods 10 with both grooves 11 and blades 22, it may be preferred that the even-numbered rods 10 have grooves and no scraper blades and that the odd-numbered rods 10 have scraper blades and no grooves.

Figure 5:
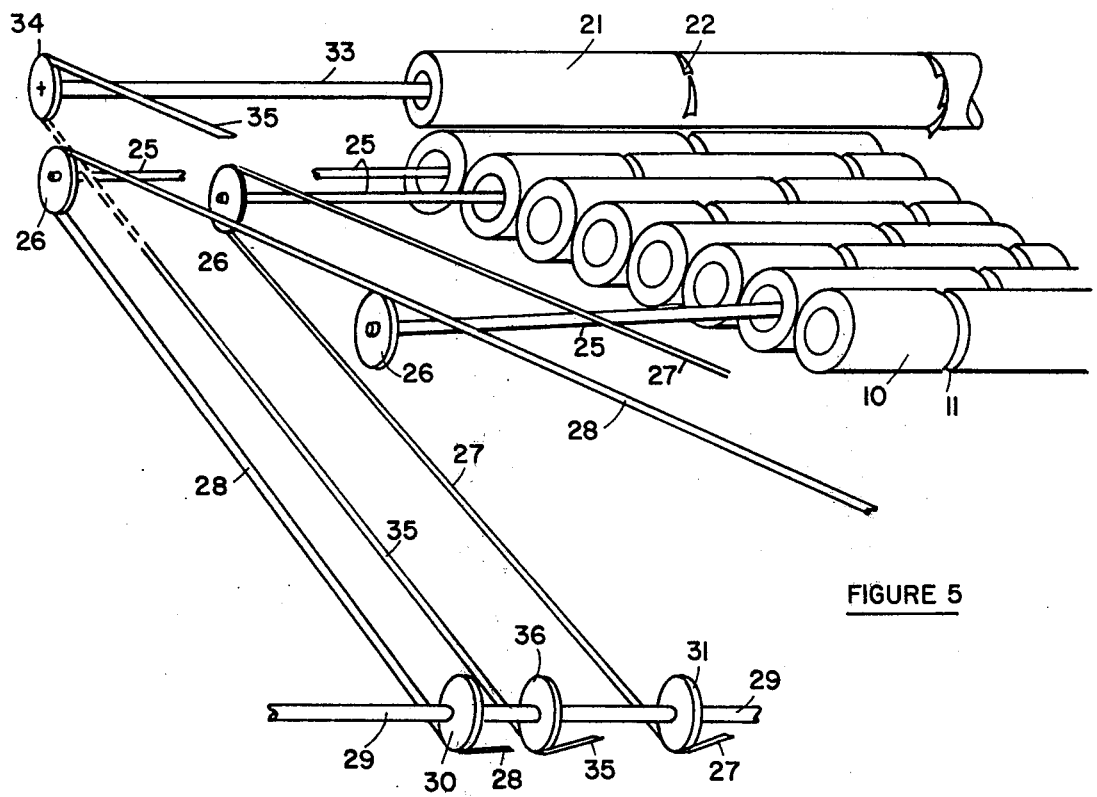
FIG. 5 is a perspective elevation of a practical arrangement of most of the parts of the distributor of FIG. 3.

In FIG. 5, the hollow grooved rods 10 are shown with one (of a succession of parallel) hollow bladed rollers 21, the other rollers 21 being omitted for clarity of illustration. The rods and rollers are hollow so that a heat exchange fluid can be passed therethrough. Each rod is rotated by a shaft 25 which is of smaller diameter than the hollow interior and which engages against the respective roller by a key and keyway or spline engagement permitting the passage of air therethrough. Alternate shafts 25 are of different lengths and are provided with pulley wheels 26, alternate pulley wheels being in one of two different planes and being driven by respective belts 27, 28 which in turn are driven from a shaft 29 through two pulley wheels 30, 31. The offset arrangement of the plane of the pulley wheels 26, 30 and belt 28 relative to the plane of the wheels 26, 31 and belt 27 enables the rods 10 to be driven in the same sense. The offset is exaggerated in the drawing for clarity of illustration. Similarly, the rollers 21 are rotated by relatively narrow shafts 33 engaged in the hollow interior thereof, there being a pulley wheel 34 at the end of each shaft 33 which is driven by a belt 35, the latter being in turn driven from a pulley wheel 36 on the shaft 29. As with the drive arrangement for the rods 10, the pulley wheels 34 are in two offset planes (the other driving pulley wheel on the shaft 29 not being shown in FIG. 4). The foregoing arrangement allows the throughflow of fluid through the rods 10 and rollers 21 and the rotation of the rods and rollers in the same sense.

In the arrangement depicted in FIG. 6, a gear drive is employed to rotate the rods 10. Alternate rollers are preferably, for convenience, driven from opposite ends so that they can be rotated at different speeds. As shown, the rods 10a have gear teeth 110 at one end, alternate rods 10b having gear teeth (not shown) at the other end. The gear teeth of adjacent rollers 10a are mechanically connected in a gear train by idling wheels ("idlers") 111 and a driven gear wheel 112 transmits rotational movement to the gear train by engagement with the gear teeth 110 as shown, or alternatively, by engagement with one of the idlers 111. A similar gear train may be provided at the opposite end of the rods 10b.

Figure 7:
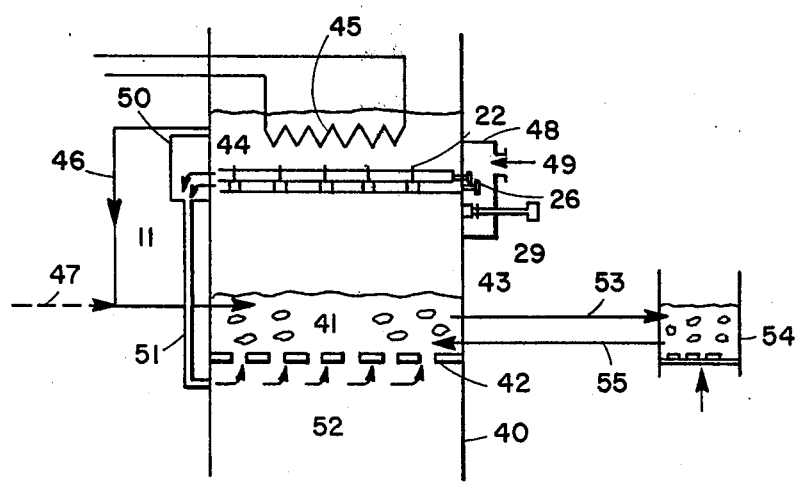
FIG. 7 shows diagrammatically a vertical cross-section through an installation comprising the distributor of FIG. 5.

FIG. 7 shows an installation comprising a containing wall 40 within which are supported beds of fluidized particles at different levels. The lowest bed 41 contains particles comprising CaO and is supported on a gas distributor 42 of any type. A sulphur-containing fuel is passed into the bed 41 and heated air is passed into the base of the bed 41 from beneath the distributor 42. The air contains from 15% to 25% of the amount of oxygen required for complete combustion of the fuel and the fuel is converted at temperatures of from 800° to 1150° C. to hot fuel gas, sulphur from the fuel being fixed predominantly as CaS in bed 41. The hot fuel gas passes up from bed 41 to the distributor 43 which comprises an arrangement of rods and rollers as described with reference to FIG. 4. Any entrained fines, tars and condensible materials which tend to deposit in the apertures of the distributor 43 are removed by the blades 22 registering in the grooves 11. A bed 44 of particles comprising CaO or a thermal precursor thereof is supported above the distributor 43 and fluidized by the hot gases passing thereinto and therethrough. A cooling coil 45, immersed in the bed 44 maintains the temperature of the latter sufficiently low to condense tars and like heavy and condensible materials and substantially tar-free gas leaves from the top of bed 44.

The rods 11 and rollers 22 are rotated via pulley wheels 26, 24, 34 respectively driven from a shaft 29. The pulley wheels 26, 34 and driving pulleys and belts are enclosed in a chest 48 into which combustion air is blow from inlet 49 and the air passes through the hollow interiors of the rods and rollers to emerge into a chest 50 on the other side of the installation. The air is heated on passing through the rods 10 and rollers 21 and the thus heated air passes from the chest 50 and via a duct 51 to the space 52 beneath the distributor 42 and thereafter enters the bed 41. The use of heated air in bed 41 and the recovery of tars from the gases leaving bed 41 improves the efficiency of the installation. The tarry materials can be circulated from bed 44 to bed 41 via line 46 for conversion to lighter components and their removal from the gases reduces the amount of deposition of hydrocarbonaceous material in ducts and cyclones (not shown) downstream of the bed 44. The maximum level of the bed 44 is defined by a weir constituted by the entrance to line 46 by means of which excess solids overflow into line 46. The excess solids are directed into the bed 41 by a stream of gas from line 47.

In order to maintain the sulphur-fixing properties of the bed 41, particles are removed via line 53 from one region of bed 41 and passed to a regenerator 54 wherein they are fluidized with an oxygen-containing gas under conditions for converting at least some of the CaS to CaO with the liberation of $SO_2$. Particles are returned to another region of bed 41 via line 55, which remove particles from a region of the regenerator 54 remote from that at which the particles enter the regenerator.

Referring to FIGS. 8 and 9, there is depicted a pressure vessel comprising lateral walls 140 and dished ends 141 attached thereto by flanges. The upper dished end 141 has an internal annular flange 142 to which a top flange 143 of a fuel gasification unit 144 is attached. The unit 144 is rectangular (e.g. square) in horizontal cross-section as is apparent from FIG. 9. The unit 144 has an air distributor 145, which as shown, is of the type described in U.K. Pat. No. 1,396,588 although it may alternatively be according to the invention or any other suitable distributor. The distributor 145 supports a bed 146 of particles comprising CaO. A sulphur-containing fuel (e.g. oil, coal or oil-coal slurry) is passed into the bed 146 from one (or more) nozzles 147 which are connected to an external source by a flexible conduit 147a to accommodate thermal expansion and contraction in the different parts of the installation. The fuel is converted to hot combustible products in the bed 146 and most of the fuel sulphur is retained as solid compounds of sulphur in the bed 146.

Spaced above the bed 146 is a distributor 148 according to the invention. The distributor 148 comprises hollow externally grooved rollers 149 of which at least alternate rollers have scraper blades (not shown) for cleaning out the grooves. A bed 150 of fluidizable particulate solids, preferably comprising CaO, is supported on the distributor 149 and maintained at a tar-condensing temperature (e.g. 350° C.) by an immersed quenching coil 151 through which a heat exchange fluid such as water and/or steam is passed.

The rollers 149 are cooled by air passing therethrough from an air inlet 152 in the lateral wall 140 of the vessel, and baffles (not shown) may be provided to promote a uniform air flow through the rollers 149. The air from the inlet 152 also passes over the outside of the unit 144 thereby recovering heat before entering the bed 146 via distributor 145. The rollers 149 are rotated by a gear drive of the type shown in FIG. 6. Alternate rollers of the distributor 148 are driven from opposite ends of the distributor as is apparent particularly from FIG. 9. Drive shafts 154, 155 are provided on each side of the vessel 140 and enter through seals 156. The shafts are connected by universal couplings 157 to worm drives 158 which are, in turn, connected to the mechanical gear train for rotating the rollers 149 as explained in relation to FIG. 6.

Substantially tar-free gases pass upwardly out of the bed 150 to an outlet 158 at the top of the upper dished end 141 of the pressure vessel. The gases are passed to one or more cyclone separators and entrained solids thereby removed are returned to bed 150 via diplegs 159.

The distributor 148 may be sloped as described in relation to FIGS. 1 and 2 and tarry solids from bed 150 may be removed from a drain (not shown) at the lowest point and passed into bed 146 by a suitable conduit (not shown). The amount of solids in the beds 150 and 146 may be maintained at a substantially constant level by known means.

The sulphur-fixing activity of the bed 146 may be maintained by the expedients described in relation to FIG. 7. The regenerator 54 may be accommodated either inside or outside the pressure vessel.

What we claim is:

1. A distributor for distributing a fluid substantially uniformly from an upstream side thereof to a downstream side, the distributor transversely disposed of the fluid passing from said upstream to said downstream side and comprising a plurality of elongate cylindrical members arranged in side-by-side contiguous relationship with the longitudinal axes of adjacent members being substantially parallel to each other, contiguous parts of the surfaces of adjacent members being disposed in mutual contact, at least some of the elongate members having circumferential recesses in their surfaces such that each said recess defines with a contiguous surface portion of an adjacent contacting elongate member an aperture for the passage of fluid from said upstream side to said downstream side, at least some of said elongate members being mounted for rotation about their respective longitudinal axes, drive means operatively connected with the rotatable elongate members for rotating said rotatable elongate members about their longitudinal axes, and deposit-removing means mounted and arranged for being at least partly received in said apertures at least intermittently for removing material deposited in said apertures.

2. A distributor according to claim 1 in which said deposit removing means is provided on said contiguous part of the surface.

3. A distributor according to claim 2 in which said deposit-removing means is supported on said support members which are mounted for rotation about their longitudinal axes and said longitudinal axes extend substantially parallel to the elongate members and means for rotating said support members.

4. A distributor according to claim 1 in which said elongate members are hollow for the passage therethrough of a heat exchange fluid.

5. A distributor according to claim 1 comprising means for supporting the elongate members with one of their axial ends higher than the opposite end, whereby all of said elongate members slope downward towards said opposite end.

6. A distributor according to claim 4 in which the apertures are smaller towards the higher end and larger towards the lower end of the sloping members.

7. A distributor according to claim 1 in combination with a vessel including at least one said distributor mounted in said vessel between the top and bottom thereof.

8. A distributor according to claim 1 in combination with a vessel having a plurality of upper and lower distributors wherein said distributors are mounted in said vessel between the top and bottom thereof and said vessel includes weir means for defining the maximum level to which a bed of particles is supported on said upper one of said distributors and means for directing particles which have passed over the weir via said lower distributor into a space defined between said lower distributor and an upper distributor.

9. A distributor according to claim 1 in which said drive means is operatively connected to said cylindrical elongate members for rotating said cylindrical elongate members in the same sense.

10. A distributor according to claim 1 in which the surface of each cylindrical member is substantially smooth, except where the surface is interrupted by a circumferential recess.

* * * * *